(12) United States Patent
Ameyugo

(10) Patent No.: US 8,936,508 B2
(45) Date of Patent: Jan. 20, 2015

(54) METHOD OF AVOIDING A GRID CLOGGING, A GRID AND AN AIR INTAKE IMPLEMENTING SUCH A METHOD

(75) Inventor: Gregorio Ameyugo, Blagnac (FR)

(73) Assignee: Airbus Helicopters, Marignane Cedex (FR)

( * ) Notice: Subject to any disclaimer, the term of this patent is extended or adjusted under 35 U.S.C. 154(b) by 512 days.

(21) Appl. No.: 13/164,961

(22) Filed: Jun. 21, 2011

(65) Prior Publication Data

US 2011/0319008 A1    Dec. 29, 2011

(30) Foreign Application Priority Data

Jun. 24, 2010    (FR) ...................................... 10 02639

(51) Int. Cl.
| | | |
|---|---|---|
| *F24F 7/00* | (2006.01) | |
| *B64D 33/02* | (2006.01) | |
| *B64D 15/16* | (2006.01) | |
| *F02C 7/055* | (2006.01) | |
| *F01D 25/02* | (2006.01) | |

(52) U.S. Cl.
CPC ................ *B64D 33/02* (2013.01); *B64D 15/16* (2013.01); *F02C 7/055* (2013.01); *F01D 25/02* (2013.01); *B64D 2033/022* (2013.01); *F05D 2220/329* (2013.01)
USPC ...................................................... 454/254

(58) Field of Classification Search
CPC ............................. B64D 33/02; F03D 11/0025
USPC ................ 454/254; 244/17.11, 17.13, 134 R, 244/134 E, 134 F, 53 B, 538, 134 A; 60/39.093; 310/321, 323.01, 328
See application file for complete search history.

(56) References Cited

U.S. PATENT DOCUMENTS

| | | | |
|---|---|---|---|
| 3,362,663 A | * | 1/1968 | Wehrmann ..................... 244/130 |
| 3,998,048 A | | 12/1976 | Derue |
| 4,393,650 A | | 7/1983 | Pool |
| 4,501,398 A | * | 2/1985 | Sandorff ................... 244/134 R |

(Continued)

FOREIGN PATENT DOCUMENTS

| | | |
|---|---|---|
| DE | 102008007469 A1 | 8/2009 |
| FR | 2250671 A1 | 6/1975 |

(Continued)

OTHER PUBLICATIONS

Goraj, Z, "An Overview of the De-Icing and Anti-Icing Technologies With Prospects for the Future", 24th Congress of International Council of the Aeronautical Sciences, Aug. 29-Sep. 3, 2004, Yokohama, Japan, Paper ICAS 2004-7.5.1 (I.L.).*

(Continued)

*Primary Examiner* — Kang Hu
*Assistant Examiner* — Anthony Kandare
(74) *Attorney, Agent, or Firm* — Brooks Kushman P.C.

(57) ABSTRACT

The present invention relates to an air intake grid (11) having a mesh (12) provided with elongate elements (16), two adjacent elongate elements (16) crossing at a node (14, 15). At least one elongate element (16) is surrounded by at least one anti-icing member (20), said anti-icing member (20) having a downstream portion (22) matching the shape of said corresponding elongate element (16) and an elongate upstream portion (21) that is resilient and that vibrates under the effect of vortices generated by a flow of air (30) passing through said grid (11) after ice has become deposited (31) on said upstream portion (21).

17 Claims, 1 Drawing Sheet

(56) References Cited

U.S. PATENT DOCUMENTS

| | | | | |
|---|---|---|---|---|
| 4,526,031 | A | * | 7/1985 | Weisend et al. .................. 73/147 |
| 4,760,978 | A | * | 8/1988 | Schuyler et al. .......... 244/134 D |
| 4,848,514 | A | * | 7/1989 | Snyder .......................... 181/290 |
| 5,029,440 | A | * | 7/1991 | Graber et al. .............. 60/39.093 |
| 5,411,224 | A | * | 5/1995 | Dearman et al. ............ 244/53 B |
| 5,686,003 | A | * | 11/1997 | Ingram et al. .................. 219/201 |
| 5,697,394 | A | * | 12/1997 | Smith et al. .................. 137/15.1 |
| 6,102,333 | A | * | 8/2000 | Gerardi et al. ............. 244/134 R |
| 6,491,262 | B1 | * | 12/2002 | Kota .............................. 244/219 |
| 6,837,459 | B2 | * | 1/2005 | Gonidec et al. ............. 244/53 B |
| 6,890,152 | B1 | * | 5/2005 | Thisted .............................. 416/1 |
| 7,084,553 | B2 | * | 8/2006 | Ludwiczak ................... 310/328 |
| 8,128,361 | B2 | * | 3/2012 | Dawson et al. .................. 416/1 |
| 8,146,866 | B2 | * | 4/2012 | Tenebre et al. ........... 244/134 R |
| 8,292,579 | B2 | * | 10/2012 | Magnuson ...................... 416/39 |
| 8,382,039 | B2 | * | 2/2013 | Calder ..................... 244/134 B |
| 8,517,313 | B2 | * | 8/2013 | Gornik ..................... 244/134 R |
| 2009/0101760 | A1 | | 4/2009 | Ghogomu |
| 2010/0189560 | A1 | * | 7/2010 | Haraguchi ........................ 416/1 |
| 2010/0288882 | A1 | * | 11/2010 | Olson et al. ................ 244/134 D |
| 2011/0011981 | A1 | * | 1/2011 | Vauchel et al. ........... 244/134 B |
| 2011/0036950 | A1 | * | 2/2011 | Guillermond et al. .... 244/134 R |
| 2011/0133025 | A1 | * | 6/2011 | Vauchel et al. ............... 244/1 N |

FOREIGN PATENT DOCUMENTS

| | | |
|---|---|---|
| GB | 626571 A | 7/1949 |
| GB | 663194 A | 12/1951 |

OTHER PUBLICATIONS

Search Report and Written Opinion; Application No. FR 1002639; dated Feb. 4, 2011.

* cited by examiner

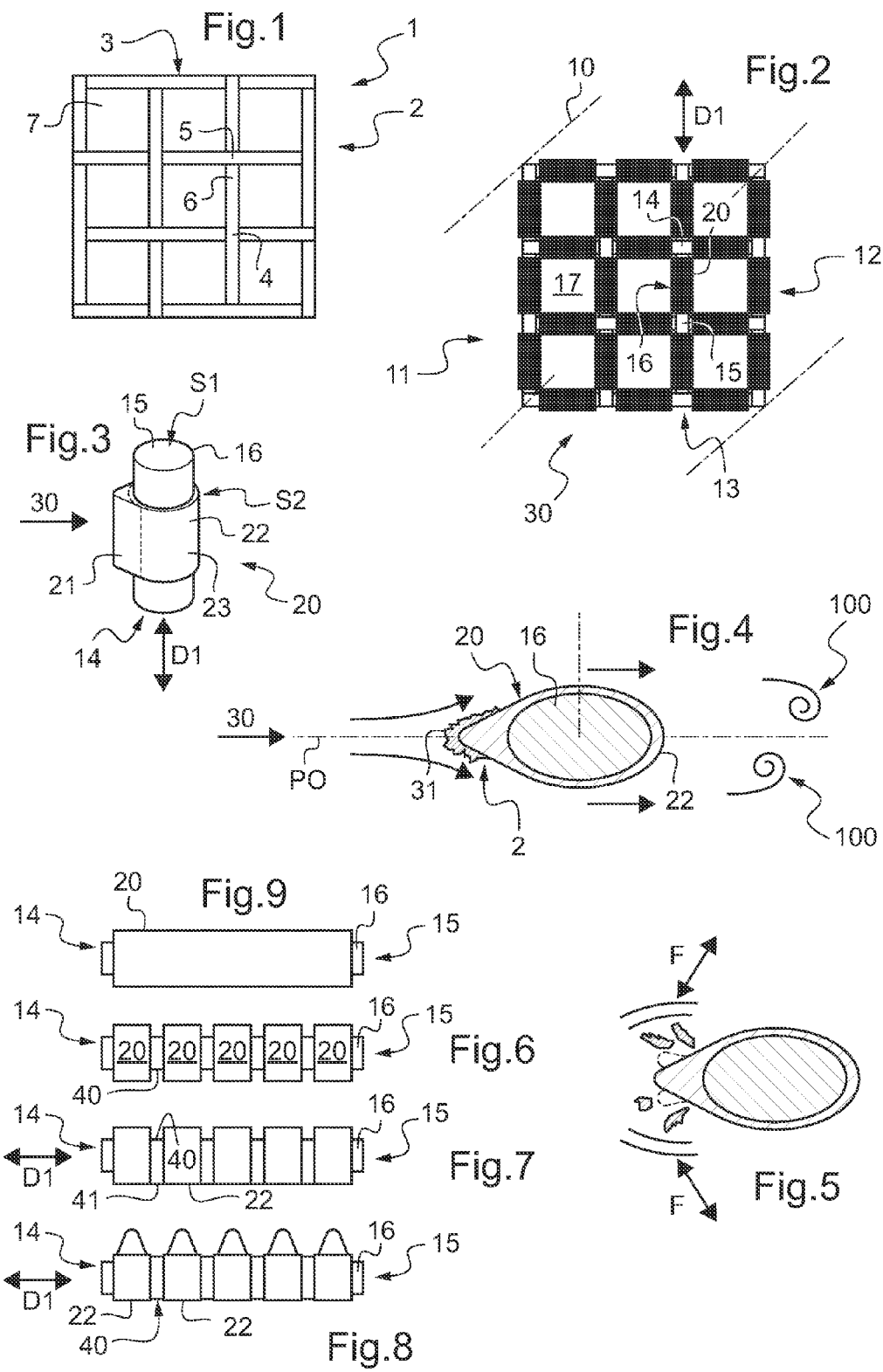

METHOD OF AVOIDING A GRID CLOGGING, A GRID AND AN AIR INTAKE IMPLEMENTING SUCH A METHOD

CROSS REFERENCE TO RELATED APPLICATIONS

This application claims the benefit of FR 10 02639 filed on Jun. 24, 2010, now FR 2,961,789 B1 issued Jul. 20, 2012, the disclosure of which is incorporated in its entirety by reference herein.

BACKGROUND OF THE INVENTION (1) Field of the Invention

The present invention relates to an air intake grid and in particular to an air intake in an aircraft power plant, the aircraft having a rotary wing, for example.

The technical field of the invention is more particularly restricted to the field of combating icing on air intake grids.

(2) Description of Related Art

Since rotorcraft need to operate in a variety of environments, including under extreme conditions, the turboshaft engine(s) of such a rotorcraft needs to be protected so as to withstand such conditions.

To feed a rotorcraft turboshaft engine with air, the engine has an air intake, and the air intake is provided with a duct connecting the engine to the outside air. Two types of air intake can be distinguished, namely:

a dynamic air intake that is fed with outside air under the effect firstly of the forward speed of the aircraft and secondly of the suction drawn in by the engine; and a static air intake that is fed with air solely under the effect of the suction drawn in by the engine.

In order to avoid the engine ingesting solid bodies that might damage it, e.g. birds, it is common practice to protect an air intake with a grid. Said solid bodies are then blocked by the grid and do not run the risk of penetrating into the engine.

Although effective, that solution presents a drawback under so-called "icing" flying conditions, and this applies more particularly with dynamic air intakes. Under such flying conditions, ice becomes deposited on the grid and closes off the interstices in the grid, partially, or even totally.

Consequently, the air intake becomes partially, or even totally, closed. The supply of air to the engine is thus reduced, or even eliminated, thereby giving rise to a significant, or even a complete, drop in the power developed by said engine, which could lead to an incident.

To remedy that, it is possible to envisage using an oversized grid. For a dynamic air intake having an area through which air penetrates dynamically into the dynamic air intake, the protective grid has first and second air-passing sections, with the first air-passing section facing the air-passing area, in contrast to the second air-passing section that does not face said area. The grid can be said to be somewhat like a mushroom cap covering the dynamic air intake.

Thus, only the first air-passing section runs the risk of picking up ice. Under icing conditions, the second air-passing section continues to guarantee at least some minimum air flow rate.

It should be observed that aircraft manufacturers have thus devised a variety of devices for protecting the air intake of turboshaft engines so as to prevent particles of all kinds being ingested by such engines. For example, document FR 2 250 671 discloses a multipurpose air intake capable both of preventing the turboshaft engine from ingesting particles and of allowing flight to take place under icing conditions, without suffering significant loss of performance from the engine.

Document U.S. Pat. No. 4,393,650 is remote from the invention since it relates to a gas turbine having a pointed rotating fairing as opposed to a stationary grid. That rotating fairing has a rigid conical end followed by a rotating flexible frustoconical portion for breaking the plates of ice that become deposited on the fairing.

Similarly, document GB 663 194 describes a rotary screen provided with wires that are elongate in a radial direction, said screen co-operating with an annular groove that is drained by pipework.

Thus, ice that is deposited on the wires is expelled towards the groove and then evacuated by the pipework. It is also possible to inject a de-icing fluid onto the wires.

Document U.S. Pat. No. 5,411,224 describes a grid provided with a front portion and a rear portion, the rear portion having pointed rigid elements for breaking up foreign bodies that might pass through the grid.

SUMMARY OF THE INVENTION

A particular object of the present invention is thus to propose a method and an optimized grid for operating under icing conditions.

Thus, the invention provides a method of avoiding clogging of a stationary grid of an air intake in icing conditions, the grid comprising a mesh provided with a plurality of elongate elements, two adjacent elongate elements crossing at a node, each elongate element extending in a long direction between a first node and a second node.

The grid then has a conventional mesh. Such a mesh may be obtained using grid-type crossed bars for example, each elongate element representing a bar segment extending between two nodes, each node representing an intersection between two bars. The bars are sometimes referred to as "wires".

According to the method, an anti-icing member is placed around at least one elongate element, the anti-icing member vibrating under the effect of vortices generated by ice being deposited on said anti-icing member as the incoming air stream passes through the air intake of the engine.

Thus, the invention makes it possible to avoid ice forming on a grid that is not moving in rotation, contrary to certain teachings.

Surprisingly, it is found that the deposition of ice gives rise to a change in the shape of the assembly comprising the anti-icing member and the ice.

Under normal conditions, while the grid is passing a flow of air, the air flow splits on contact with each elongate element, thereby simultaneously creating two vortices behind the grid.

In contrast, when flying under icing conditions, ice adheres to the anti-icing member that covers the elongate element, and more precisely adheres to its portion that is referred to for convenience as its portion that is "upstream" with reference to the flow direction of the air.

The deposition of ice gives rise to a disturbance that modifies the shape of the assembly comprising the anti-icing member and the ice, by making it asymmetrical relative to the flow direction, for example. This results in two vortices being created on either side of the anti-icing member, no longer simultaneously, but rather in alternation. This offset in the creation of vortices causes the vibrating member to vibrate, and in particular causes its upstream portion to vibrate.

This vibration breaks the mass of ice on the upstream portion of the anti-icing member. The ice thus separates from the grid.

This method thus makes it possible to prevent the grid becoming clogged.

It should be observed that the physical phenomenon that gives rise to vibration of the anti-icing member is sometimes referred to as "vortex-induced vibration" (VIV).

Furthermore, such a phenomenon gives rise to turbulence downstream from the obstacle as constituted by the grid, which turbulence is known under the term "Karman vortex streets". Nevertheless, surprisingly, such turbulence is not harmful insofar as it disappears when the mass of ice detaches from the anti-icing member.

The method is optimized when the upstream portion of the anti-icing member is made of an elastic material. It should be observed that the upstream portion represents the leading edge of the anti-icing member.

In addition to the method, the invention provides an air intake grid suitable for implementing the method.

According to the invention, an air intake grid then comprises a mesh provided with elongate elements, two adjacent elongate elements crossing at a node, each elongate element extending in a long direction between a first node and a second node.

Furthermore, the grid is remarkable in that at least one elongate element is surrounded by at least one anti-icing member, the anti-icing member having a downstream portion arranged on the corresponding elongate element, and an elongate and resilient upstream portion that vibrates under the effect of vortices generated by a flow of air passing through the grid as a result of ice depositing on the upstream portion, the downstream portion being downstream from the upstream portion relative to the flow of air.

The downstream portion presents a profile that does not generate vortex formation in the absence of ice, e.g. by matching the shape of the elongate element.

Thus, the grid has a covering provided with anti-icing members placed on its elongate elements.

In the event of ice becoming deposited on the upstream portion of an anti-icing member, the above-explained phenomenon causes said upstream portion to vibrate and consequently causes the ice to become detached.

The grid may have one or more of the following characteristics.

For example, an elongate element provided with an anti-icing member presents a section that is elliptical, the downstream portion of the anti-icing member having a section that is elliptical.

This guarantees that the anti-icing member remains in a given position.

This characteristic is unusual, since the bars of a grid usually present sections that are circular.

Furthermore, the upstream and downstream portions of an anti-icing member are secured to each other. They may be distinct and assembled together by any known method, or together they form a one-piece part.

According to another aspect of the invention, the upstream portion is made of a material selected from the group of elastomers.

In a first embodiment, between two nodes, an elongate element has a plurality of anti-icing members, with spacing separating adjacent pairs of anti-icing members.

In a first variant of this first embodiment, the spacing is empty.

In a second variant of this first embodiment, the spacing includes a cover separating two downstream portions of two adjacent anti-icing members by surrounding the elongate element between two anti-icing members, the cover having the same shape as said elongate element.

An elongate element may then comprise a sequence of an anti-icing member, a cover, and an anti-icing member, said sequence optionally being reproduced several times.

The cover is optionally secured to the adjacent anti-icing members.

In a second embodiment, an elongate element has a single anti-icing member extending from a first node towards a second node.

It should be observed that it is possible to obtain the second variant of the first embodiment by hollowing out grooves in an elongate element of the second embodiment.

Furthermore, each elongate element in contact with the air flow passing through the grid advantageously includes an anti-icing member.

Finally, the invention provides an air intake having a protective grid, the grid being a grid according to the invention.

BRIEF DESCRIPTION OF THE DRAWINGS

The invention and its advantages appear in greater detail from the following description of embodiments given by way of illustration with reference to the accompanying figures, in which:

FIG. 1 is a diagram showing a grid of a known type;

FIG. 2 is a view of a grid of the invention arranged in an air intake shown diagrammatically;

FIG. 3 is a view of an elongate element provided with an anti-icing member;

FIGS. 4 and 5 are sections showing the method implemented;

FIGS. 6 to 8 are diagrams showing a first embodiment; and

FIG. 9 is a diagram showing a second embodiment.

DETAILED DESCRIPTION OF THE PREFERRED EMBODIMENT

Elements present in more than one of the figures are given the same references in each of them.

FIG. 1 shows a grid 1 of a known type suitable for protecting an air intake, e.g. of a power plant.

The grid 1 comprises a mesh 2 having orifices 7 defined by first bars 3 and second bars 6 that are interlaced, with a first bar 3 and a second bar 6 crossing at a node 4, 5.

Each bar has a plurality of segments in the form of elongate elements, each elongate element extending between a first node 4 and a second node 5. Thus, each mesh of the grid comprises an orifice 7 defined by elongate elements going from one node to another node.

FIG. 1 shows a grid having a square mesh. Other types of mesh may be devised, such meshes nevertheless being provided with orifices that are defined by a plurality of elongate elements, each elongate element going from one node of the mesh to another node.

A grid 1 of this type is effective for preventing undue penetration of solid particles into an engine, for example.

Nevertheless, under icing conditions, ice may become deposited on the elongate elements and may potentially clog the orifices of the grid.

FIG. 2 shows an air intake 10 of the invention represented by dashed lines.

The air intake 10 is provided with a novel grid 11.

The grid 11 comprises a mesh 12 made up of a plurality of elongate elements 16, each elongate element extending in a long direction D1 from a first node 14 of the mesh to a second node 15. Two adjacent elongate elements 16 thus join at a node.

The mesh may be obtained from crossed bars, each bar comprising a succession of elongate elements 16.

The mesh 12 that is shown is square in shape, an orifice 17 of the grid 11 being defined by four elongate elements 16 connected together by four nodes. Other forms of mesh could be devised without going beyond the ambit of the invention.

According to the invention, an anti-icing member 20 is placed around at least one elongate element 16, the anti-icing member vibrating under the effect of vortices generated by ice depositing on the anti-icing member 20. More precisely, and for reasons of convenience, the term "vibrating under the effect of vortices generated by a deposit of ice" is used to designate the establishment of a phenomenon also known as "vortex-induced vibration" that occurs when a mass of ice forms on the elongate element.

Advantageously, each elongate element 16 that is in contact with the air flow 30 passing through the grid includes an anti-icing member 20.

FIG. 3 shows an anti-icing member 20 arranged around an elongate element 16 extending from a first node 14 to a second node 15 in a long direction D1. It should be observed that the long direction D1 is at a non-zero angle of inclination relative to the direction followed by the flow of air 30 passing through the grid, being perpendicular to said flow of air 30, for example.

The anti-icing member 20 possess an upstream portion 21 provided with a leading edge of the anti-icing member (relative to the air flow 30), and a downstream portion 22 provided with a trailing edge of the anti-icing member (relative to the air flow 30).

The downstream portion 22 is shaped to match the shape of the elongate element 16 that it surrounds in the version shown. Nevertheless, the downstream portion could also possess a streamlined profile so that in the absence of ice it does not generate turbulence giving rise to vibration of the anti-icing member.

It should be observed that the elongate element 16 may have a section S1 that is elliptical, the downstream portion 22 then also having a section S2 that is elliptical or faired. This characteristic serves to prevent the anti-icing member turning around the elongate element.

Furthermore, the upstream portion has a profile that forms a tip for capturing ice. This portion is optionally made of a material selected from the group of elastomers in order to enhance its elasticity. It is possible to select an elastomer that has a glass transition temperature that is low, of the order of −40° C., for example, so as to guarantee that operation is acceptable over the entire flying range of an aircraft fitted with said grid 11.

With reference to FIG. 3, the upstream portion 21 and the downstream portion 22 form a single one-piece part, as opposed to constituting two distinct elements that are secured to each other.

In a variant that is not shown, the upstream portion 21 and the downstream portion 22 are two distinct parts that are secured to each other.

It should be observed that independently of the variant, it is possible to thread the anti-icing member 20 about the elongate element 16 during fabrication of the grid 11.

By way of example, another technique consists in making a continuous covering over the trailing edge of the upstream portion so as to be able to clip the anti-icing member 20 elastically onto the elongate element 16.

FIGS. 4 and 5 explain the operation of the invention.

With reference to FIG. 4, in icing conditions, a mass of ice may form on the grid 11. The upstream portion 21 of an anti-icing member 20 is upstream from the other members of the grid 11, so ice builds up on said upstream portion 21.

The flow of air 30 passing through the grid then gives rise to vortices 100, and more precisely to two vortices 100 that are offset from each other downstream from each anti-icing member 20.

With reference to FIG. 5, this offset of the vortices 100 drives vibration of the anti-icing member, and in particular of its upstream portion 21. The movement of the portion 21 along arrows F breaks up the build up of ice, which is then eliminated by being entrained in the flow of air.

No movement of the grid 11 is therefore required to achieve such breaking.

In order to encourage breaking, it is possible to envisage heating the elongate elements using conventional means.

FIGS. 6 to 8 show a first embodiment.

In this first embodiment, a plurality of anti-icing members 20 are arranged on a common elongate element 16 between two nodes 14 and 15.

Any two adjacent anti-icing members 20 on a given elongate element 16 are then spaced apart by spacing 40.

In a first variant of this first embodiment, as shown in FIG. 6, the spacing 40 is empty.

Conversely, in a second variant of this first embodiment, as shown in FIGS. 7 and 8, the spacing 40 is provided with a cover 41 surrounding the elongate element between two downstream portions 22 of two adjacent anti-icing members 20 on the same elongate element 16. It can be understood that said two downstream portions 22 of two adjacent anti-icing members 20 may be secured to the cover 41 between them.

FIGS. 7 and 8 also show two different variants of the upstream portion 21 of the anti-icing members 20. The upstream portion 21 completely covers the downstream portion 22 of an anti-icing member 20 in the long direction D1 in the variant of FIG. 7, and covers part of the downstream portion 22 of an anti-icing member 20 in the long direction D1 in the variant of FIG. 8.

Finally, in the second embodiment of FIG. 9, the elongate element 16 has a single anti-icing member 20 extending from a first node 14 to a second node 15.

It can be seen that by machining such an anti-icing member, it is possible to obtain the second variant of the first embodiment.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A method of avoiding clogging of a stationary grid of an air intake in icing conditions, the method comprising:
   providing a grid having a mesh with a plurality of elongate elements, including two adjacent elongate elements crossing at a node, each elongate element extending in a long direction (D1) between a first node and a second node;
   mounting an anti-icing member around at least one elongate element between the first node and the second node, the anti-icing member having a hollow core with a cross-section corresponding to a cross-section of the at least one elongate element to prevent rotation of the anti-icing member relative to the at least one elongate element;
   configuring the anti-icing member to have an upstream portion that splits airflow generally symmetrically in the absence of ice to create two balanced vortices behind the grid that do not induce vibrations in the anti-icing member; and providing the upstream portion with a tip for capturing ice, such that the upstream portion splits airflow asymmetrically in the presence of ice creating two unbalanced vortices, inducing vibrations in the upstream portion under the effect of the unbalanced vortices generated by the ice being deposited on the anti-icing member.

2. An air intake grid comprising:
a mesh provided with elongate elements, two adjacent elongate elements crossing at a node, a first elongate element extending in a long direction (D1) between a first node and a second node defining a central portion between the first node and the second node, the first elongate element having a cross-section;

at least one anti-icing member surrounding the central portion of the first elongate element, the anti-icing member having a hollow core with a cross-section corresponding to the cross-section of the first elongate element to inhibit rotation relative to the first elongate element, the anti-icing member further having a downstream portion arranged on the first elongate element in a downstream direction, and an elongate and resilient upstream portion that splits airflow generally symmetrically in the absence of ice to create two balanced vortices behind the grid that do not induce vibrations in the anti-icing member, the upstream portion having a tip configured to capture ice, such that the upstream portion splits airflow asymmetrically in the presence of ice creating two unbalanced vortices inducing vibrations in the upstream portion under the effect of the unbalanced vortices as a result of the ice depositing on the upstream portion, the downstream portion being downstream from the upstream portion relative to the flow of air.

3. A grid according to claim 2, wherein the first elongate element presents a section (S1) that is elliptical, the downstream portion of the anti-icing member having a section (S2) that is elliptical.

4. A grid according to claim 2, wherein the upstream portion and the downstream portion together form a one-piece part.

5. A grid according to claim 2, wherein the upstream portion is made of a material selected from the group of elastomers.

6. A grid according to claim 2, wherein, between two nodes, the first elongate element has a plurality of anti-icing members, with spacing separating adjacent pairs of anti-icing members.

7. A grid according to claim 6, wherein the spacing includes a cover matching the shape of the first elongate element and separating two downstream portions of two adjacent anti-icing members.

8. A grid according to claim 2, wherein the first elongate element has a single anti-icing member extending along the central portion.

9. A grid according to claim 2, wherein each elongate element in contact with the flow of air includes an anti-icing member.

10. An air intake provided with a protective grid, wherein the grid is a grid in accordance with claim 2.

11. A grid according to claim 5, wherein the material selected from the group of elastomers has a glass transition temperature on the order of −40° C.

12. An air intake grid comprising:
a mesh having a plurality of elongate members including a first elongate member having a periphery defining a cross section, the plurality of elongate members defining a plurality of nodes at crossing points including first and second nodes at respective crossing points on the first elongate member; and an anti-icing member having a hollow core with a cross-section corresponding to the cross section of the first elongate member, the anti-icing member including a first portion secured to the periphery of the first elongate member between the first node and the second node to prevent rotation of the anti-icing member relative to the first elongate member, the anti-icing member further including an upstream portion configured to split airflow generally symmetrically in the absence of ice to create two balanced vortices behind the grid that do not induce vibrations in the anti-icing member, the upstream portion having a resilient tip at a first end oriented in an upstream direction relative to a flow of air passing through the grid, the resilient tip being configured to capture ice from an air intake, split airflow asymmetrically and generate unbalanced vortices in the flow of air in response to captured ice, and induce vibrations in response to the generated unbalanced vortices, the anti-icing member further having a streamlined cross-section at a second end oriented in a downstream direction relative to the flow of air so that in the absence of ice the second end does not generate turbulence giving rise to vibrations in the anti-icing member.

13. The grid of claim 12, wherein the first elongate member has an elliptical cross-section normal to a long axis and the anti-icing member has a corresponding elliptical cross-section at a second end oriented in a downstream direction relative to the flow of air.

14. The grid of claim 12, further comprising additional anti-icing members arranged about respective members of the plurality of elongate members between respective nodes of the plurality of nodes.

15. The grid of claim 12, wherein the first portion of the anti-icing member surrounds the first elongate member.

16. The grid of claim 12, wherein the anti-icing member has a profile with a line of symmetry that is parallel to a direction of the flow of air.

17. The grid of claim 12, wherein the anti-icing member is threaded about the one of the plurality of elongate members.

* * * * *